(12) United States Patent
Kihara et al.

(10) Patent No.: US 11,331,876 B2
(45) Date of Patent: May 17, 2022

(54) ELECTRICALLY INSULATING RESIN COMPOSITION AND LAMINATE SHEET

(71) Applicants: NITTO SHINKO CORPORATION, Sakai (JP); NITTO DENKO CORPORATION, Ibaraki (JP)

(72) Inventors: Yasuyuki Kihara, Fukui (JP); Akira Tamai, Fukui (JP); Hiroichi Ukei, Osaka (JP); Tomoyuki Kasagi, Osaka (JP); Mizuki Yamamoto, Osaka (JP)

(73) Assignees: NITTO SHINKO CORPORATION, Sakai (JP); NITTO DENKO CORPORATION, Ibaraki (JP)

( * ) Notice: Subject to any disclaimer, the term of this patent is extended or adjusted under 35 U.S.C. 154(b) by 440 days.

(21) Appl. No.: 15/191,683

(22) Filed: Jun. 24, 2016

(65) Prior Publication Data
US 2016/0303821 A1 Oct. 20, 2016

Related U.S. Application Data

(62) Division of application No. 13/810,013, filed as application No. PCT/JP2011/065683 on Jul. 8, 2011, now abandoned.

(30) Foreign Application Priority Data

Jul. 16, 2010 (JP) .............. JP2010-161731
Jul. 16, 2010 (JP) .............. JP2010-161737
Jun. 28, 2011 (JP) .............. JP2011-143157

(51) Int. Cl.
*B32B 5/02* (2006.01)
*B32B 27/12* (2006.01)
(Continued)

(52) U.S. Cl.
CPC .............. *B32B 5/022* (2013.01); *B32B 27/08* (2013.01); *B32B 27/12* (2013.01); *B32B 27/286* (2013.01);
(Continued)

(58) Field of Classification Search
USPC ..... 442/149, 151; 428/200, 297.1, 343, 352, 428/349
See application file for complete search history.

(56) References Cited

U.S. PATENT DOCUMENTS 4,145,474 A    3/1979  Kertscher et al.
4,446,191 A *  5/1984  Miyadera ............... B29C 70/08
                                                    442/198

(Continued)

FOREIGN PATENT DOCUMENTS

BR    PI0902618-5 A2   5/2010
CN    1242866 A        1/2000
(Continued)

OTHER PUBLICATIONS

Communication dated Mar. 5, 2014, issued by the State Intellectual Property Office of the People's Republic of China in corresponding Application No. 201180034970.8.
(Continued)

*Primary Examiner* — Lynda Salvatore
(74) *Attorney, Agent, or Firm* — Sughrue Mion, PLLC

(57) ABSTRACT

The present invention provides an electrically insulating resin composition comprising a polysulfone resin including a plurality of sulfonyl groups in the molecule and a polyamide resin, wherein the proportion of the polyamide resin is 1 to 45% by mass. The present invention also provides a laminate sheet obtained by bonding a plurality of sheet materials with a resin composition layer interposed therebetween, wherein the resin composition layer comprises a
(Continued)

polysulfone resin including a plurality of sulfonyl groups in the molecule and a polyamide resin, and the proportion of the polyamide resin is 1 to 45% by mass.

10 Claims, 1 Drawing Sheet

(51) Int. Cl.
| | |
|---|---|
| B32B 27/08 | (2006.01) |
| B32B 27/28 | (2006.01) |
| B32B 27/34 | (2006.01) |
| C08L 81/06 | (2006.01) |
| H01B 3/30 | (2006.01) |
| C09D 181/06 | (2006.01) |
| C08J 5/18 | (2006.01) |
| C08L 77/06 | (2006.01) |

(52) U.S. Cl.
CPC .......... *B32B 27/34* (2013.01); *C08J 5/18* (2013.01); *C08L 81/06* (2013.01); *C09D 181/06* (2013.01); *H01B 3/301* (2013.01); *H01B 3/305* (2013.01); *H01B 3/308* (2013.01); *B32B 2250/40* (2013.01); *B32B 2262/0269* (2013.01); *B32B 2270/00* (2013.01); *B32B 2307/206* (2013.01); *B32B 2307/306* (2013.01); *B32B 2307/54* (2013.01); *B32B 2457/00* (2013.01); *B32B 2457/08* (2013.01); *C08J 2377/06* (2013.01); *C08J 2381/08* (2013.01); *C08L 77/06* (2013.01); *Y10T 428/2848* (2015.01); *Y10T 428/31533* (2015.04); *Y10T 442/674* (2015.04)

(56) References Cited

U.S. PATENT DOCUMENTS

| | | | | |
|---|---|---|---|---|
| 5,424,104 | A | | 6/1995 | Amimoto et al. |
| 5,527,844 | A | * | 6/1996 | Weber .............. C08L 71/00 524/237 |
| 5,597,631 | A | * | 1/1997 | Furumoto ......... B29C 70/086 428/36.4 |
| 5,760,147 | A | | 6/1998 | Schonfeld et al. |
| 6,280,843 | B1 | * | 8/2001 | Murayama ......... B29C 70/50 428/408 |
| 6,329,055 | B1 | | 12/2001 | Higasgiura et al. |
| 8,568,635 | B2 | * | 10/2013 | Takaoka ............ B29C 43/22 264/171.12 |
| 8,829,100 | B2 | | 9/2014 | Kernick et al. |
| 2004/0126523 | A1 | | 7/2004 | Masuda et al. |
| 2004/0135371 | A1 | | 7/2004 | Masuda et al. |
| 2004/0209007 | A1 | * | 10/2004 | Satake .............. B32B 27/08 428/1.3 |
| 2005/0260404 | A1 | * | 11/2005 | Iwade .............. B32B 37/10 428/325 |
| 2009/0047858 | A1 | | 2/2009 | Kihara et al. |
| 2009/0098325 | A1 | | 4/2009 | Uchida et al. |
| 2009/0148641 | A1 | | 6/2009 | Uchida et al. |
| 2010/0062206 | A1 | | 3/2010 | Tada et al. |

FOREIGN PATENT DOCUMENTS

| | | |
|---|---|---|
| CN | 101180182 | 5/2008 |
| CN | 101670699 A | 3/2010 |
| DE | 26 38 763 A1 | 1/1978 |
| DE | 195 14 320 A1 | 10/1996 |
| DE | 10 2004 054 389 A1 | 5/2006 |
| DE | 10 2004 054 390 A1 | 5/2006 |
| EP | 0463238 | 6/1990 |
| EP | 0 463 238 A1 | 1/1992 |
| EP | 0 477 757 A2 | 4/1992 |
| EP | 0 488 335 A2 | 6/1992 |
| EP | 0 522 307 A2 | 1/1993 |
| EP | 0 738 760 A1 | 10/1996 |
| EP | 0 949 634 A1 | 10/1999 |
| EP | 1 741 549 A1 | 1/2007 |
| EP | 1 741 553 A1 | 1/2007 |
| EP | 1 860 134 A | 11/2007 |
| EP | 1 864 796 A1 | 12/2007 |
| EP | 2 153 987 A1 | 2/2010 |
| EP | 2 236 560 A1 | 10/2010 |
| JP | 6122825 | 5/1994 |
| JP | 8-283568 A | 10/1996 |
| JP | 11-66958 A | 3/1999 |
| JP | 11-176245 A | 7/1999 |
| JP | 2006-321183 A | 11/2006 |
| JP | 2007-186672 A | 7/2007 |
| JP | 2007-276457 A | 10/2007 |
| JP | 2010-30222 A | 2/2010 |
| JP | 2011-4565 A | 1/2011 |
| KR | 2000-0069417 A | 11/2000 |
| KR | 10-2010-0013268 A | 2/2010 |
| TW | 409263 B | 10/2000 |
| WO | 99/19885 A1 | 4/1999 |
| WO | 2009/052015 | 4/2009 |
| WO | 2009/096401 A | 8/2009 |
| WO | 2010/150669 A1 | 12/2010 |

OTHER PUBLICATIONS

Hideo Hayashi et al., "Compatability and Mechanical Properties of Binary Blends Composed of Aromatic Poly(ether sulfone) and Poly (m-phenyleneisophthalamide) by Solution Blending", Polymer Journal, 1994, pp. 527-534, vol. 26, No. 5.

International Search Report for PCT/JP2011/065683 dated Oct. 11, 2011.

Masaki Hayashi et al., "The influence of wettability on the morphology of blends of polysulfones and polyamides", Polymer, 1998, pp. 299-308, vol. 39, No. 2.

Piyada Charoensirisomboon et al., "Reactive PSU/PA blends: comparison of materials prepared by mini-twin screw extruder and batch mixer", Polymer, 2001, pp. 7009-7016.

Communication dated Dec. 21, 2016, issued by the Korean Intellectual Property Office in corresponding Korean Application No. 10-2013-7003894.

Extended European Search Report issued in corresponding EP Application No. 11806708.1 dated Aug. 8, 2016.

Notice of Opposition dated Aug. 22, 2019, from the European Patent Office in counterpart European Application No. 11806708.1.

"Experimentelle Daten" (Other Evidence); submitted with Notice of Opposition on Aug. 6, 2019 (4 pages total).

Summons to attend Oral Proceedings dated Jul. 8, 2020, issued by the European Patent Office in application No. 11806708.1.

* cited by examiner

F I G. 1
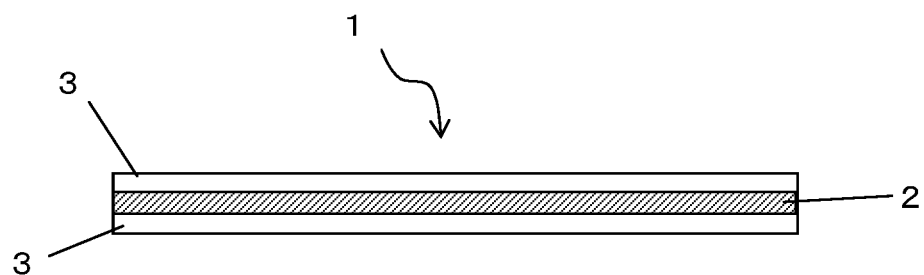
F I G. 2
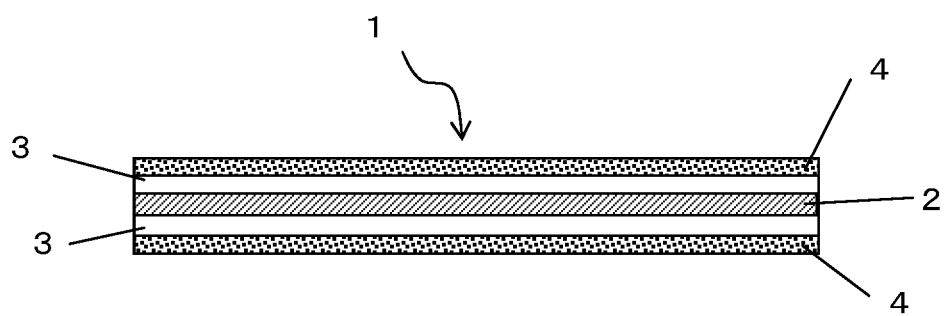

ELECTRICALLY INSULATING RESIN COMPOSITION AND LAMINATE SHEET

This is a divisional of U.S. application Ser. No. 13/810,013 filed Jan. 14, 2013, which is a national stage PCT/JP2011/065683, filed Jul. 8, 2011, which claims priority from JP 2010-161731, filed Jul. 16, 2010; JP 2010-161737, filed Jul. 16, 2010; and JP 2011-143157, filed Jun. 28, 2011, the contents of all of which are hereby incorporated by reference into this application.

TECHNICAL FIELD

The present invention relates to an electrically insulating resin composition. The present invention also relates to a laminate sheet formed of a plurality of sheet materials bonded with a resin composition layer obtained by forming the resin composition into a sheet-like shape being interposed between the sheet materials.

BACKGROUND ART

Various electrically insulating resin compositions are known in the related art. For example, an electrically insulating resin composition used by arranging the composition around a coil wire, which is a heating body in a motor, is known.

As such an electrically insulating resin composition, specifically, for example, an electrically insulating resin composition comprising a polyphenylene sulfide resin having an aromatic hydrocarbon and a plurality of sulfide bonds (—S—) in the molecule and a vinyl copolymer, and formed into a sheet-like shape has been proposed (Patent Document 1).

Unfortunately, the electrically insulating resin composition has tracking resistance as electrical insulation properties which is demanded between one coil wire and another coil wire in the motor, or the like, while tensile strength or the like may be reduced due to heat generated by the coil wire or the like. Thus, heat resistance is not always sufficient.

Namely, the electrically insulating resin composition is relatively difficult to have excellent heat resistance and excellent tracking resistance at the same time.

As the conventional laminate sheet, a laminate sheet obtained by bonding a plurality of sheet materials with an electrically insulating resin composition layer formed in a sheet-like shape being interposed therebetween is known, for example. Such a laminate sheet can be arranged around the coil wire in the motor as described above, and used.

As such a laminate sheet, specifically, two sheets of a polyamide paper as a sheet material formed of an aromatic polyamide fiber bonded with a resin layer containing a polyphenylene sulfide (PPS) resin being interposed therebetween has been proposed, for example (Patent Document 2). In such a laminate sheet, peel off of the sheet material from the resin layer is suppressed by adhesiveness between the sheet material and the resin layer.

Unfortunately, in the laminate sheet, mechanical properties such as tensile strength may be reduced by heat generated from the coil wire or the like in the motor, for example, and heat resistance is not always sufficient.

Namely, the laminate sheet is relatively difficult to satisfy suppression in interlayer peel between the sheet material and the resin layer and to satisfy excellent heat resistance at the same time.

CITATION LIST

Patent Document

Patent Document 1: Japanese Patent Laid-Open No. 2007-186672
Patent Document 2: Japanese Patent Laid-Open No. 2010-030222

SUMMARY OF INVENTION

Technical Problem

The present invention has been made in consideration of the problems. An object of the present invention is to provide an electrically insulating resin composition having excellent heat resistance and excellent electrical insulation properties.

Another object of the present invention is to provide a laminate sheet having excellent heat resistance and satisfying suppression in interlayer peel.

Solution to Problem

An electrically insulating resin composition according to the present invention comprises a polysulfone resin including a plurality of sulfonyl groups (—$SO_2$—) in a molecule, and a polyamide resin, wherein a proportion of the polyamide resin is 1 to 45% by mass.

When the electrically insulating resin composition having such a configuration contains the polysulfone resin and the polyamide resin of which proportion is 1 to 45% by mass, the electrically insulating resin composition can have excellent tracking resistance and excellent heat resistance.

Preferably, in the electrically insulating resin composition according to the present invention, the polysulfone resin is a polyether sulfone resin further including a plurality of ether bonds in the molecule, or a polyphenylsulfone resin further including a plurality of aromatic hydrocarbons in the molecule.

When the polysulfone resin is the polyether sulfone resin or the polyphenylsulfone resin, advantageously, the electrically insulating resin composition has good moldability, and also has excellent tracking resistance and excellent heat resistance.

Preferably, in the electrically insulating resin composition according to the present invention, the polyamide resin contains an aromatic hydrocarbon. When the polyamide resin contains an aromatic hydrocarbon, advantageously, the electrically insulating resin composition can have excellent tracking resistance and more excellent heat resistance.

Preferably, the electrically insulating resin composition according to the present invention has a CTI value of not less than 130 V in a tracking resistance test. Preferably, a tear resistance value is not less than 20 MPa. Preferably, a strength retention of tensile strength after 250 hours have passed at 240° C. is not less than 55%.

The electrically insulating resin composition according to the present invention is preferably formed into a sheet-like shape. Moreover, the electrically insulating resin composition according to the present invention is preferably used in application of electrical insulation.

A laminate sheet according to the present invention is obtained by bonding a plurality of sheet materials with a resin composition layer interposed between the sheet materials, wherein the resin composition layer comprises a polysulfone resin including a plurality of sulfonyl groups in the molecule and a polyamide resin, and the proportion of the polyamide resin is 1 to 45% by mass.

The laminate sheet having such a configuration is obtained by bonding the plurality of sheet materials with the resin composition layer interposed therebetween, wherein the resin composition layer comprises the polysulfone resin and the polyamide resin, and the proportion of the polyamide resin is 1 to 45% by mass. Thereby, interlayer peel can be suppressed, and excellent heat resistance can be provided.

In the laminate sheet according to the present invention, the sheet materials each preferably contain a wholly aromatic polyamide. The laminate sheet according to the present invention has an advantage in that the wholly aromatic polyamide contained in the sheet material can provide more excellent heat resistance to the laminate sheet.

Preferably, the sheet material is paper produced by a wet papermaking method. Preferably, the sheet material is a wholly aromatic polyamide paper comprising a wholly aromatic polyamide fiber. The laminate sheet according to the present invention has an advantage in that more excellent heat resistance of the laminate sheet can be provided by the sheet material which is the wholly aromatic polyamide paper comprising the wholly aromatic polyamide fiber.

In the laminate sheet according to the present invention, the sheet materials each are preferably a non-woven fabric. The laminate sheet according to the present invention has an advantage in that the non-woven fabric as the sheet material can further suppress interlayer peel between the sheet material and the resin composition layer.

In the laminate sheet according to the present invention, at least a surface of the sheet material on the side of the resin composition layer is preferably subjected to a corona treatment. The laminate sheet according to the present invention has an advantage in that the interlayer peel between the sheet material and the resin composition layer can be further suppressed by performing the corona treatment.

In the laminate sheet according to the present invention, the polysulfone resin is preferably a polyether sulfone resin further including a plurality of ether bonds in the molecule, or a polyphenylsulfone resin further including a plurality of aromatic hydrocarbons in the molecule.

Moreover, in the laminate sheet according to the present invention, the polyamide resin is preferably a polyamide resin including an aromatic hydrocarbon in the molecule. The laminate sheet according to the present invention has an advantage in that more excellent heat resistance of the laminate sheet can be provided by the polyamide resin which is the polyamide resin including an aromatic hydrocarbon in the molecule.

Preferably, the laminate sheet according to the present invention further comprises a sheet-like pressure-sensitive adhesive layer having pressure-sensitive adhesiveness, wherein the pressure-sensitive adhesive layer is disposed on at least one of topmost surfaces of the laminate sheet. Preferably, the pressure-sensitive adhesive layer has flame retardancy that meets the UL94 VTM-0 standard.

The laminate sheet according to the present invention is preferably used in application of electrical insulation.

Advantageous Effects of Invention

The electrically insulating resin composition according to the present invention has effects of providing excellent heat resistance and excellent electrical insulation properties.

The laminate sheet according to the present invention has effects of providing excellent heat resistance and suppressing interlayer peel.

BRIEF DESCRIPTION OF DRAWINGS

FIG. 1 is a sectional view schematically showing a cross section of a laminate sheet cut in the thickness direction.

FIG. 2 is a sectional view schematically showing a laminate sheet including a pressure-sensitive adhesive layer in which the laminate sheet is cut in the thickness direction.

DESCRIPTION OF EMBODIMENTS

Hereinafter, one embodiment of an electrically insulating resin composition according to the present invention will be described.

The electrically insulating resin composition according to the present embodiment comprises a polysulfone resin including a plurality of sulfonyl groups in the molecule and a polyamide resin, wherein the proportion of the polyamide resin is 1 to 45% by mass.

The electrically insulating resin composition may have poor heat resistance when the proportion of the polyamide resin is more than 45% by mass. Moreover, the electrically insulating resin composition may have insufficient tracking resistance when the proportion of the polyamide resin is less than 1% by mass.

In the electrically insulating resin composition, the proportion of the polyamide resin is preferably not less than 3% by mass, more preferably not less than 5% by mass, still more preferably not less than 8% by mass, and most preferably not less than 15% by mass. Moreover, the proportion of the polyamide resin is preferably not more than 40% by mass, more preferably not more than 35% by mass, and still more preferably not more than 32% by mass.

When the proportion of the polyamide resin is not less than 3% by mass, advantageously, the electrically insulating resin composition can obtain more excellent tracking resistance as electrical insulation properties. When the proportion of the polyamide resin is not more than 40% by mass, advantageously, the electrically insulating resin composition can obtain more excellent heat resistance.

The polysulfone resin has a molecular structure having a plurality of sulfonyl groups ($-SO_2-$).

Examples of the polysulfone resin include polyether sulfone resins further including a plurality of ether bonds ($-O-$) in the molecule, or a polyphenylsulfone resin further including a plurality of aromatic hydrocarbons in the molecule. Further examples of the polysulfone resin include polyether polyphenylsulfone resins further including a plurality of ether bonds and a plurality of aromatic hydrocarbons in the molecule.

A preferable polysulfone resin is the polyether polyphenylsulfone resins because the electrically insulating resin composition can have good moldability, and can have excellent tracking resistance and excellent heat resistance.

The polyether polyphenylsulfone resin preferably has the molecular structure represented by the following formula (1):

[Formula 1]

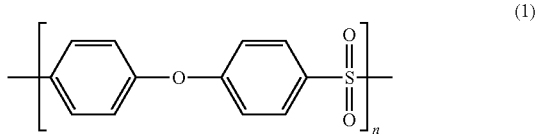
(1)

wherein n is a positive integer indicating a polymerization degree, and usually in the range of 10 to 5000.

As the polyether polyphenylsulfone resin, commercially available products can be used. Examples of those products include "ULTRASON E Series" made by BASF SE, "Radel A Series" made by Solvay Advanced Polymers, L.L.C., and "SUMIKAEXCEL Series" made by Sumitomo Chemical Co., Ltd., and so on.

The polyamide resin is prepared by polymerizing at least a polyamine compound with a polycarboxylic acid compound by dehydration condensation.

Examples of the polyamide resin include polyamide resins having an aromatic hydrocarbon in the molecule, and aliphatic polyamide resins having only an aliphatic hydrocarbon as hydrocarbon in the molecule. Among these, polyamide resins having an aromatic hydrocarbon in the molecule are preferable because the electrically insulating resin composition can have excellent tracking resistance and more excellent heat resistance.

Examples of the polyamide resins having an aromatic hydrocarbon in the molecule include wholly aromatic polyamide resins having only an aromatic hydrocarbon as hydrocarbon in the molecule, and semi-aromatic polyamide resins having both of an aliphatic hydrocarbon and an aromatic hydrocarbon as hydrocarbon in the molecule.

A preferable polyamide resin having an aromatic hydrocarbon in the molecule is the semi-aromatic polyamide resins because tracking resistance and heat resistance are well balanced.

Examples of the polyamine compound used for polymerization of the polyamide resin specifically include diamine compounds.

Examples of the diamine compound include aliphatic diamines including a linear or branched hydrocarbon group, alicyclic diamines including a cyclic saturated hydrocarbon group, and aromatic diamines including an aromatic hydrocarbon group.

Examples of the aliphatic diamines, the alicyclic diamines, or the aromatic diamines include those represented by the following formula (2). In the following formula (2), $R_1$ represents an aliphatic hydrocarbon group having 4 to 12 carbon atoms, an alicyclic hydrocarbon group including a cyclic saturated hydrocarbon and having 4 to 12 carbon atoms, or a hydrocarbon group having an aromatic ring.

$$H_2N-R_1-NH_2 \qquad (2)$$

As the aliphatic diamines, nonane diamines in which $R_1$ in the formula (2) has 9 carbon atoms are preferable, and a mixture of 1,9-nonanediamine and 2-methyl-1,8-octanediamine is more preferable because the polyamide resin can have more excellent tracking resistance.

Examples of the aromatic diamines include phenylenediamine and xylylenediamine.

Examples of the polycarboxylic acid compound used for polymerization of the polyamide resin specifically include dicarboxylic acid compounds.

Examples of the dicarboxylic acid compounds include aliphatic dicarboxylic acids including a linear or branched hydrocarbon group, alicyclic dicarboxylic acids including a cyclic saturated hydrocarbon group, and aromatic dicarboxylic acids including an aromatic hydrocarbon group.

Examples of the aliphatic dicarboxylic acids, the alicyclic dicarboxylic acids, or the aromatic dicarboxylic acids include those represented by the following formula (3). In the following formula (3), $R_2$ represents an aliphatic hydrocarbon group having 4 to 25 carbon atoms, an alicyclic hydrocarbon group including a cyclic saturated hydrocarbon and having 4 to 12 carbon atoms, or a hydrocarbon group having an aromatic ring.

$$HOOC-R_2-COOH \qquad (3)$$

Examples of the aliphatic dicarboxylic acids include adipic acid and sebacic acid.

Examples of the aromatic dicarboxylic acids include terephthalic acid, methylterephthalic acid, and naphthalenedicarboxylic acid. A preferable aromatic dicarboxylic acid is terephthalic acid because the polyamide resin can have more excellent heat resistance.

The polyamide resin may be prepared by polymerizing one of the diamine compounds with one of the dicarboxylic acid compounds, or may be prepared by polymerizing the diamine compounds in combination with the dicarboxylic acid compounds. When necessary, the polyamide resin may be prepared by polymerizing the diamine compound and the dicarboxylic acid compound with other compound.

As described above, as the polyamide resin, the semi-aromatic polyamide resins are preferable. As the semi-aromatic polyamide resins, those prepared by polymerizing the aliphatic diamine as the diamine compound with the aromatic dicarboxylic acid as the dicarboxylic acid compound are more preferable, and those prepared by polymerizing nonanediamine as the aliphatic diamine with terephthalic acid as the aromatic dicarboxylic acid (PA9T) are particularly preferable.

In the electrically insulating resin composition, a variety of additives may be blended.

Examples of the additives include: pressure-sensitive adhesives such as alkylphenol resins, alkylphenol-acetylene resins, xylene resins, coumarone-indene resins, terpene resins, and rosin; bromine flame retardants such as polybromodiphenyl oxide and tetrabromobisphenol A; chlorine flame retardants such as chlorinated paraffin and perchlorocyclodecane; phosphorus flame retardants such as phosphoric acid ester and halogen-containing phosphoric acid ester; boron flame retardants; oxide flame retardants such as antimony trioxide; metal hydrate compounds such as aluminum hydroxide and magnesium hydroxide; antioxidants such as phenol antioxidants, phosphorus antioxidants, and sulfur antioxidants; inorganic fillers such as silica, clay, calcium carbonate, barium carbonate, strontium carbonate, aluminum oxide, magnesium oxide, boron nitride, silicon nitride, and aluminum nitride; and ordinary blending components for plastics such as a heat stabilizer, a light stabilizer, an ultraviolet absorbing agent, a lubricant, a pigment, a crosslinking agent, a crosslinking aid, a silane coupling agent, and a titanate coupling agent. Examples of the additives include aromatic polyamide fibers, and montmorillonite having a particle size of several to several hundreds nanometers. These additives can be used in a proportion of 0.1 to 5 parts by weight based on 100 parts by weight of the electrically insulating resin composition, for example.

The electrically insulating resin composition preferably has a CTI value of not less than 130 V in the tracking resistance test, which is measured by the method described in Examples, because more excellent tracking resistance as the electrical insulation properties can be obtained.

The electrically insulating resin composition preferably has a strength retention of tensile strength of not less than 55% after 250 hours have passed at 240° C., which is measured by the method described in Examples, because more excellent heat resistance can be obtained.

The electrically insulating resin composition preferably has a tear resistance value of not less than 20 MPa, which is measured by the method described in Examples, because more excellent tear resistance can be obtained.

The electrically insulating resin composition can be produced by mixing at least the polysulfone resin and the polyamide resin using an ordinary mixing and stirring apparatus such as a kneader, a pressure kneader, a kneading roll, a Banbury mixer, and a twin screw extruder. Alternatively, the electrically insulating resin composition can be produced by using a dry blend, for example, and mixing and stirring the dry blend in a cylinder or the like of an extruder.

The electrically insulating resin composition can be molded into a sheet-like shape using an extruder including a T die, an injection molding machine, or the like. A laminate sheet can be produced by bonding a sheet material such as paper formed of an aromatic amide resin fiber to both surfaces of the electrically insulating resin composition molded into a sheet-like shape, for example.

The produced laminate sheet can be suitably used in application that needs electrical insulation properties and heat resistance. Specifically, for example, the laminate sheet can be used in applications of a sheet material for electrical insulation used by arranging the sheet around a coil wire, which is a heating body in a motor, a sheet material for electrical insulation used in transformers, bus bars, capacitors, cables, and the like, and insulating films for electric circuit boards.

Next, a laminate sheet according to one embodiment of the present invention will be described with reference to the drawings. FIG. 1 and FIG. 2 each are a sectional view schematically showing a cross section of the laminate sheet according to the present embodiment cut in the thickness direction.

As shown in FIG. 1, a laminate sheet 1 according to the present embodiment is obtained by bonding a plurality of sheet materials 3 with a sheet-like resin composition layer 2 interposed therebetween, wherein the resin composition layer 2 comprises the polysulfone resin including a plurality of sulfonyl groups in the molecule and the polyamide resin, and the proportion of the polyamide resin is 1 to 45% by mass.

The resin composition layer 2 is obtained by forming the resin composition comprising the polysulfone resin and the polyamide resin into a sheet-like shape such that the proportion of the above polyamide resin is 1 to 45% by mass. Namely, the resin composition layer 2 is obtained by forming the above electrically insulating resin composition into a sheet-like shape.

The resin composition layer 2 may have inferior heat resistance when the proportion of the polyamide resin is more than 45% by mass. When the proportion of the polyamide resin is less than 1% by mass, interlayer peel between the resin composition layer 2 and the sheet material 3 may be likely to occur.

In the resin composition layer 2, the proportion of the polyamide resin is preferably not less than 3% by mass, more preferably not less than 5% by mass, still more preferably not less than 8% by mass, and most preferably not less than 15% by mass. The proportion of the polyamide resin is preferably not more than 40% by mass, more preferably not more than 35% by mass, and still more preferably not more than 32% by mass.

When the proportion of the polyamide resin is not less than 3% by mass, advantageously, interlayer peel between the resin composition layer 2 and the sheet material 3 can be difficult to occur. When the proportion of the polyamide resin is not more than 40% by mass, advantageously, the resin composition layer 2 can have more excellent heat resistance and more excellent flame retardancy.

The thickness of the resin composition layer 2 is not particularly limited, and usually is 1 μm to 500 μm.

Examples of the polysulfone resin and the polyamide resin include the same ones as those described above.

The polyamide resins having an aromatic hydrocarbon in the molecule are preferable as the polyamide resins because the resin composition layer 2 can have more excellent heat resistance. The semi-aromatic polyamide resins are preferable as the polyamide resins because more excellent heat resistance can be obtained and interlayer peel between the sheet material 3 and the resin composition layer 2 can be further suppressed.

Nonane diamines in which $R_1$ in the formula (2) has 9 carbon atoms are preferable, and a mixture of 1,9-nonanediamine and 2-methyl-1,8-octanediamine is more preferable as the aliphatic diamine used for polymerization of the polyamide resin because interlayer peel between the sheet material and the resin composition layer can be further suppressed.

Terephthalic acid is preferable as the aromatic dicarboxylic acid used for polymerization of the polyamide resin because the polyamide resin can have more excellent heat resistance.

As described above, as the polyamide resin, the semi-aromatic polyamide resins are preferable. As the semi-aromatic polyamide resin, those prepared by polymerizing the aliphatic diamine as the diamine compound with the aromatic dicarboxylic acid as the dicarboxylic acid compound are more preferable, and those prepared by polymerizing nonanediamine as the aliphatic diamine with terephthalic acid as the aromatic dicarboxylic acid (PA9T) are particularly preferable.

As described above, a variety of additives may be blended with the resin composition layer 2.

The sheet material 3 may be any sheet material having a sheet-like shape, and is not particularly limited. The thickness is not particularly limited, and usually is 10 to 100 μm. As shown in FIG. 1, usually, two sheet materials 3 are included in the laminate sheet.

Examples of the sheet material 3 include paper, non-woven fabrics, and films. As the sheet material 3, paper or non-woven fabrics are preferable because interlayer peel between the sheet material and the resin composition layer can be further suppressed.

Examples of the sheet material 3 include those produced by a wet papermaking method, those produced in the air by a dry method, and so on.

As the sheet material 3, the paper produced by the wet papermaking method is preferable because interlayer peel between the sheet material and the resin composition layer can be further suppressed.

Examples of a material for the sheet material 3 include synthetic polymer compounds such as polyamides and polyesters, and natural polymer compounds such as cellulose.

Polyamides are preferable because interlayer peel between the sheet material and the resin composition layer can be further suppressed.

Examples of the polyamide include wholly aromatic polyamides in which all of the constituent monomers have an aromatic hydrocarbon, aliphatic polyamides in which all of the constituent monomers have only an aliphatic hydrocarbon as hydrocarbon, and semi-aromatic polyamides in which part of the constituent monomers has an aromatic hydrocarbon. The wholly aromatic polyamides are preferable because interlayer peel between the sheet material and the resin composition layer can be further suppressed. Namely, the sheet material 3 preferably contains the wholly aromatic polyamide.

As the sheet material 3, a wholly aromatic polyamide paper comprising a wholly aromatic polyamide fiber is more preferable, a wholly aromatic polyamide paper produced using a wholly aromatic polyamide fiber by the wet papermaking method is still more preferable because interlayer peel between the sheet material and the resin composition layer can be further more suppressed and excellent flame retardancy is obtained.

Examples of the wholly aromatic polyamide paper include those formed of mainly a wholly aromatic polyamide fiber obtained by forming a condensation polymerization product of phenylenediamine and phthalic acid (wholly aromatic polyamide) into fibers, in which a portion except an amide group in the condensation polymerization product is composed of a benzene ring.

The wholly aromatic polyamide paper preferably has a weight of not less than 5 $g/m^2$ because the mechanical properties are excellent, and handling is easy in the step of producing the laminate sheet. At a weight of not less than 5 $g/m^2$, advantageously, insufficient mechanical strength is avoided, and thus the laminate sheet is difficult to break during production.

Other component may be blended with the wholly aromatic polyamide paper. Examples of the other component include organic fibers such as polyphenylene sulfide fibers, polyether ether ketone fibers, polyester fibers, arylate fibers, liquid crystal polyester fibers, and polyethylene naphthalate fiber; or inorganic fibers such as glass fibers, rock wool, asbestos, boron fibers, and alumina fibers.

As the wholly aromatic polyamide paper, commercially available products such as a trade name "NOMEX" made by E. I. du Pont de Nemours and Company can be used.

Preferably, the surface of the sheet material 3 on the side of the resin composition layer 2 is subjected to a corona treatment. By performing the corona treatment, advantageously, interlayer peel between the sheet material and the resin composition layer can be further suppressed.

The corona treatment is a surface roughening treatment by performing a discharging treatment on one of the surfaces of the sheet material 3 contacting the resin composition layer 2 to generate a polar carboxyl group or a hydroxyl group. As the corona treatment, known ordinary methods can be used.

The laminate sheet 1 further includes a sheet-like pressure-sensitive adhesive layer 4 having pressure-sensitive adhesiveness. The pressure-sensitive adhesive layer 4 may be disposed on at least one of the topmost surfaces of the laminate sheet. The pressure-sensitive adhesive layer 4 may be disposed only on one of the surfaces of the laminate sheet 1, or may be disposed on both of the surfaces of the laminate sheet 1 as shown in FIG. 2.

When the laminate sheet 1 includes the pressure-sensitive adhesive layer 4 on the topmost surface(s), the laminate sheet 1 can be used by bonding the pressure-sensitive adhesive layer 4 to an adherent. Specifically, the laminate sheet 1 can be used in applications that need heat resistance and electrical insulation properties; for example, the laminate sheet 1 can be used as a sheet-like electrically insulating material in the state where the pressure-sensitive adhesive layer 4 is bonded to a plate-like conductor made of a metal.

The pressure-sensitive adhesive layer 4 that can be included in the laminate sheet 1 contains at least a pressure-sensitive adhesive containing a known ordinary polymer.

Examples of the pressure-sensitive adhesive include acrylic pressure-sensitive adhesives containing an acrylic polymer having (meth)acrylate ester as a basic structural unit, rubber pressure-sensitive adhesives containing an elastomeric polymer such as synthetic rubbers and natural rubbers, silicone pressure-sensitive adhesives containing silicone polymer, polyester pressure-sensitive adhesives containing a polyester polymer, and polyurethane pressure-sensitive adhesives containing a polyurethane polymer. Among these, the acrylic pressure-sensitive adhesives are preferable because of their excellent pressure-sensitive adhesive properties and weatherability.

Preferably, the pressure-sensitive adhesive layer 4 contains a crosslinking agent that can crosslink the polymer in the pressure-sensitive adhesive, because more excellent pressure-sensitive adhesive force and durability are obtained. Examples of the crosslinking agent include isocyanate crosslinking agents, epoxy crosslinking agents, melamine crosslinking agents, oxazoline crosslinking agents, carbodiimide crosslinking agents, aziridine crosslinking agents, and metalchelate crosslinking agents. More preferably, the pressure-sensitive adhesive layer 4 further contains a tackifying resin such as rosin resins, terpene resins, aliphatic petroleum resins, aromatic petroleum resins, copolymerized petroleum resins, alicyclic petroleum resins, xylene resins, or elastomer resins because more excellent pressure-sensitive adhesive force and durability are obtained.

Other than the pressure-sensitive adhesives, crosslinking agents, and tackifying resins described above, the pressure-sensitive adhesive layer 4 can contain an additive usually added to rubber and plastics such as a dispersant, an age resistor, an antioxidant, a processing aid, a stabilizer, an antifoaming agent, a thickener, and a pigment.

The pressure-sensitive adhesive layer 4 may have a configuration obtained by mixing a flame retardant described later and the pressure-sensitive adhesive to produce a mixture and forming the mixture into a sheet-like shape, for example.

Alternatively, the pressure-sensitive adhesive layer 4 may be configured to have a sheet-like base material for enhancing shape retention of the pressure-sensitive adhesive layer, and have a layer-like body containing at least the pressure-sensitive adhesive and disposed on both surfaces of the base material, for example.

Examples of the base material that the pressure-sensitive adhesive layer 4 can have include paper base materials such as paper; fiber base materials such as fabrics, non-woven fabrics, and nets; metallic base materials such as metallic foils and metal plates; plastic base materials such as plastic films; rubber base materials such as rubber sheets; and foaming base materials such as foaming sheets. Examples of the base material also include laminate base materials obtained by laminating these base materials. As the laminate base material, those obtained by laminating a plurality of the plastic base materials, those containing at least the plastic base material, and so on are preferable.

Examples of a material for the plastic base material include olefin resins containing α-olefin such as polyethylene (PE), polypropylene (PP), ethylene-propylene copolymers, and ethylene-vinyl acetate copolymers (EVA) as a monomer component; polyester resins such as polyethylene terephthalate (PET), polyethylene naphthalate (PEN), polybutylene terephthalate (PBT); polyvinyl chloride (PVC) resins; vinyl acetate resins; polyphenylene sulfide (PPS) resins; polyamide resins such as aliphatic polyamides and wholly aromatic polyamides; polyimide resins; and polyether ether ketone (PEEK) resins. These materials for the plastic base material can be used alone or in combination of two or more.

Preferably, the laminate sheet 1 has a flame retardancy that meets the UL94 VTM-0 standard because the laminate sheet 1 can be used in applications of insulating materials for terminals that need relatively high flame retardancy. The laminate sheet 1 has such flame retardancy, and therefore can be used in applications of an insulating material for terminals in power modules such as Insulated Gate Bipolar Transistor (IGBT) modules.

The UL94 standard is a standard for a burning test established by Underwriters Laboratories Inc., the U.S., and usually known. Specifically, the flame retardancy that meets the UL94 VTM-0 standard is considered accepted according to the method described in Examples.

For the laminate sheet 1 to have the flame retardancy that meets the UL94 VTM-0 standard, the pressure-sensitive adhesive layer 4 preferably has the flame retardancy that meets the standard. When the pressure-sensitive adhesive layer 4 properly contains a proper amount of a known ordinary flame retardant, for example, the pressure-sensitive adhesive layer 4 can have the flame retardancy that meets the UL94 VTM-0 standard.

The flame retardant is not particularly limited. Examples thereof include: chlorine compounds such as chlorinated paraffin, chlorinated diphenyl, chlorinated ethane, chlorinated polyethylene, chlorinated polyphenyl, chlorinated diphenyl, perchlorocyclopentadecanone, and tetrachlorobisphenol A; bromine compounds such as brominated paraffin, brominated polyphenyl, tetrabromoethane, tetrabromobenzene, decabromodiphenyl oxide, octabromodiphenyl oxide, hexabromocyclododecane, bis(tribromophenoxy)ethane, bis(tribromophenoxy)ethane, ethylenebistetrabromophthalimide, hexabromobenzene, polydibromophenylene oxide, tetrabromobisphenol A, tris(2,3-dibromopropyl-1) isocyanurate, tribromophenol allyl ether, brominated polystyrene, tribromoneopentyl alcohol, dibromodichloropropane, and dibromotetrafluoroethane; phosphoric acid esters such as triphenyl phosphate (TPP), tricresyl phosphate (TCP), trixylenyl phosphate (TXP), cresyldiphenyl phosphate (CDP), xylenyldiphenyl phosphate (XDP), resorcinol-bis-(diphenylphosphate), 2-ethylhexyldiphenyl phosphate, dimethyl methyl phosphate, triallylphosphate (Reofos), and alkyl phosphate; halogen-containing phosphoric acid esters such as trischloroethyl phosphate, trisdichloropropyl phosphate, tris-β-chloropropyl phosphate, tris(tribromophenyl) phosphate, tris(tribromophenyl)phosphate, tris(tribromoneopentyl)phosphate, and diethyl-N,N-bis(2-hydroxyethyl) aminomethyl phosphonate; condensed phosphoric acid esters such as aromatic condensed phosphoric acid esters and halogen-containing condensed phosphoric acid esters; polyphosphoric acid salt compounds such as ammonium polyphosphate and polychlorophosphite; inorganic oxides such as antimony trioxide, antimony pentoxide, zirconium oxide, aluminum hydroxide, ferric hydroxide, and zinc borate; metal carbonates such as basic magnesium carbonate, magnesium carbonate-calcium, calcium carbonate, barium carbonate, and dolomite; and metal hydrates such as hydrotalcite and borax (hydrates of metal compounds).

The amount of the flame retardant contained in the pressure-sensitive adhesive layer 4 is not particularly limited. From the viewpoint of providing the flame retardancy and pressure-sensitive adhesive properties of the pressure-sensitive adhesive layer at the same time, the amount is preferably not more than 250 parts by weight, more preferably not less than 1 part by weight and not more than 250 parts by weight, and still more preferably not less than 5 parts by weight and not more than 200 parts by weight based on 100 parts by weight of the pressure-sensitive adhesive. When not more than 250 parts by weight of the flame retardant is contained based on 100 parts by weight of the pressure-sensitive adhesive, advantageously, reduction in pressure-sensitive adhesiveness by bleeding out the flame retardant can be suppressed.

Preferably, the laminate sheet 1 has a strength retention of tensile strength of not less than 50% after 250 hours have passed at 240° C., which is measured by the method described in Examples.

Preferably, the laminate sheet 1 is configured such that the sheet material 3 is disposed contacting each of the surfaces of the resin composition layer 2, and the interlayer adhesive force between the resin composition layer 2 and the sheet material 3 is larger than the cohesive failure force of the resin composition layer 2 and that of the sheet material 3. According to such a configuration, interlayer peel between the resin composition layer 2 and the sheet material 3 can be suppressed.

Subsequently, a method for producing the laminate sheet 1 will be described.

For example, the laminate sheet 1 can be produced by sandwiching the resin composition layer 2 with two sheet materials 3, and pressing the sheet materials 3 toward each other.

The resin composition layer 2 can be produced by mixing the polysulfone resin and the polyamide resin using an ordinary mixing device such as a kneader, a pressure kneader, a kneading roll, a Banbury mixer, and a twin screw extruder to prepare the resin composition, and extruding the resin composition into a sheet-like shape using an extruder to which a T-die is attached.

The laminate sheet 1 including the pressure-sensitive adhesive layer 4 can be produced by sandwiching the resin composition layer 2 with two sheet materials 3 and pressing the sheet materials 3 as described above, and bonding the pressure-sensitive adhesive layer of a commercially available pressure-sensitive adhesive tape to at least one surface of the pressed sheet, for example.

Utilizing the electrical insulation properties that the laminate sheet 1 has, the laminate sheet 1 can be used as sheets for electrical insulation used in motors of automobiles and the like, sheets for electrical insulation used in transformers, and sheets for electrical insulation used for bus bars, for example.

The electrically insulating resin composition and laminate sheet according to the present embodiment are as described above, but the present invention will not be limited to the laminate sheet exemplified above.

Moreover, the present invention can use various embodiments used in ordinary electrically insulating resin compositions and laminate sheets.

EXAMPLES

Next, the present invention will be described more in detail using Examples, but the present invention will not be limited to these.

Example 1

As the polysulfone resin, a polyether polyphenylsulfone resin (PES) resin (made by Solvay Advanced Polymers, L.L.C., trade name "Radel A-300A") including a plurality of sulfonyl groups, a plurality of ether bonds, and a plurality of aromatic hydrocarbons was used.

Meanwhile, as the polyamide resin, a polyamide (PA) resin comprising a terephthalic acid unit and a nonanediamine unit (PA9T made by Kuraray Co., Ltd., trade name "Genestar N1000A") was used.

The PES resin was mixed with the PA resin at a mass ratio of PES/PA=95/5 using a twin screw kneader (made by TECHNOVEL CORPORATION) at 310° C. to produce an electrically insulating resin composition.

Example 2

An electrically insulating resin composition was produced in the same manner as in Example 1 except that the mass ratio of the PES resin to the PA resin was PES/PA=90/10.

Example 3

An electrically insulating resin composition was produced in the same manner as in Example 1 except that the mass ratio of the PES resin to the PA resin was PES/PA=80/20.

Example 4

An electrically insulating resin composition was produced in the same manner as in Example 1 except that the mass ratio of the PES resin to the PA resin was PES/PA=70/30.

Example 5

An electrically insulating resin composition was produced in the same manner as in Example 1 except that the mass ratio of the PES resin to the PA resin was PES/PA=60/40.

Comparative Example 1

Instead of the electrically insulating resin composition, only the PES resin was used.

Comparative Example 2

An electrically insulating resin composition was produced in the same manner as in Example 1 except that the mass ratio of the PES resin to the PA resin was PES/PA=50/50.

Comparative Example 3

An electrically insulating resin composition was produced in the same manner as in Example 1 except that mass ratio of the PES resin to the PA resin was PES/PA=30/70.

Comparative Example 4

Instead of the electrically insulating resin composition, a polyethylene naphthalate (PEN) film (made by Teijin DuPont Films Japan Limited, trade name "Teonex 100 μm") was prepared.

Comparative Example 5

Instead of the electrically insulating resin composition, polyphenylene sulfide (PPS) film (made by Toray Industries, Inc., trade name "TORELINA 100 μm") was prepared.

<Evaluation of Long-Term Heat Resistance>

Each of the produced electrically insulating resin compositions or the resin was molded into a sheet-like shape having a thickness of 100 μm by extrusion molding at 310° C. to produce a sheet body.

Next, the sheet body was cut along the flow direction during the molding at a width of 15 mm to produce a test sample. The produced test sample was left for 250 hours in a thermostat heated to 240° C. Before and after the test sample was left in the thermostat, a tensile test was performed on the test sample on the test condition of 200 mm/min and a gauge length of 100 mm, and the tensile strength was measured. Then, the strength retention was calculated by the following expression:

strength retention (%)={(tensile strength after the test sample is left)/(tensile strength before the test sample is left)}×100

The films in Comparative Examples 4 and 5 were evaluated in the same manner as above.

<Evaluation of Tracking Resistance (Tracking Resistance Test)>

According to JIS C2134, the CTI (Comparative Tracking Index) value in the sheet body or the film was measured.

<Evaluation of Tear Resistance>

According to JIS C2111, the tear resistance value was measured in the machine direction (MD) of the sheet body or film and in the transverse direction (TD) of the sheet body or film.

The results of evaluation of the long-term heat resistance (strength retention), tracking resistance (CTI value), and tear resistance (tear resistance value) in the sheet bodies using the electrically insulating resin composition or resin or the film in Examples and Comparative Examples are shown in Table 1 and Table 2.

TABLE 1

|  | Example 1 | Example 2 | Example 3 | Example 4 | Example 5 |
| --- | --- | --- | --- | --- | --- |
| Blended resins |  | | PES/PA | | |
| PES/PA | 95/5 | 90/10 | 80/20 | 70/30 | 60/40 |
| Strength retention (%) | 84 | 70 | 67 | 63 | 60 |
| CTI value (V) | 150 | 150 | 175 | 175 | 200 |
| Tear resistance MD tear resistance (MPa) | 105 | 115 | 108 | 101 | 38 |
| Tear resistance TD tear resistance (MPa) | 109 | 106 | 159 | 125 | 110 |

TABLE 2

|  | Comparative Example 1 | Comparative Example 2 | Comparative Example 3 | Comparative Example 4 | Comparative Example 5 |
| --- | --- | --- | --- | --- | --- |
| Blended resins | PES | PES/PA | PES/PA | PEN | PPS |
| PES/PA | — | 50/50 | 30/70 | — | — |
| Strength retention (%) | 84 | 24 | 13 | 39 | 51 |
| CTI value (V) | 125 | 250 | 600 | 175 | 175 |
| Tear resistance MD tear resistance (MPa) | 85 | 4 | 39 | 300 | 270 |
| Tear resistance TD tear resistance (MPa) | 104 | 141 | 94 | 393 | 220 |

Further, a laminate sheet was produced, and the performance of the laminate sheet was evaluated.

Example 6

Two wholly aromatic polyamide paper (made by E. I. du Pont de Nemours and Company, trade name "NOMEX T410," thickness of 50 μm) were used as the sheet material.

Meanwhile, as the polysulfone resin, a polyether polyphenylsulfone (PES) resin containing a plurality of sulfonyl groups, a plurality of ether bonds, and a plurality of aromatic hydrocarbons (made by Solvay Advanced Polymers, L.L.C., trade name "Radel A-300A") was used.

As the polyamide resin, a polyamide (PA) resin comprising a terephthalic acid unit and a nonanediamine unit (PA9T made by Kuraray Co., Ltd., trade name "Genestar N1000A") was used.

Next, the PES resin was mixed with the PA resin at a mass ratio of PES/PA=95/5 using a twin screw kneader (made by TECHNOVEL CORPORATION) at 310° C. to prepare a resin composition.

Subsequently, the resin composition was molded into a sheet-like shape having a thickness of 100 μm by extrusion molding at 310° C. to form a resin composition layer. A wholly aromatic polyamide paper was disposed on both surfaces of the resin composition layer. Then, the resin composition layer with the wholly aromatic polyamide paper was sandwiched by two metal plates, and pressed at a pressure of 200 N/cm² for 60 seconds using a heat press heated to 350° C. Thus, a laminate sheet (thickness of approximately 200 μm) was produced.

Example 7

A laminate sheet was produced in the same manner as in Example 6 except that the resin composition layer was formed such that the mass ratio of the PES resin to the PA resin was PES/PA=90/10 in the resin composition layer, and the sheet material was subjected to a corona treatment and the surface subjected to the corona treatment was disposed contacting the resin composition layer.

The corona treatment was performed using a "500 Series" made by PILLAR TECHNOLOGIES, Inc. as an apparatus under an atmospheric pressure on the condition of an output of 500 W, a treatment rate of 4 m/min, and a sample width of 0.4 m.

Example 8

A laminate sheet was produced in the same manner as in Example 6 except that the resin composition layer was formed such that the mass ratio of the PES resin to the PA resin was PES/PA=90/10 in the resin composition layer.

Example 9

A laminate sheet was produced in the same manner as in Example 6 except that the resin composition layer was formed such that the mass ratio of the PES resin to the PA resin was PES/PA=80/20 in the resin composition layer.

Example 10

A laminate sheet was produced in the same manner as in Example 6 except that the resin composition layer was formed such that the mass ratio of the PES resin to the PA resin was PES/PA=80/20 in the resin composition layer, and the sheet material subjected to the same corona treatment as that in Example 7 was used.

Example 11

A laminate sheet was produced in the same manner as in Example 6 except that the resin composition layer was formed such that the mass ratio of the PES resin to the PA resin was PES/PA=70/30 in the resin composition layer.

Example 12

A laminate sheet was produced in the same manner as in Example 6 except that the resin composition layer was formed such that the mass ratio of the PES resin to the PA resin was PES/PA=60/40 in the resin composition layer.

Example 13

A pressure-sensitive adhesive layer A below was bonded to one surface of the laminate sheet produced in Example 10 to produce a laminate sheet including a pressure-sensitive adhesive layer.

pressure-sensitive adhesive layer A:
obtained by removing a releasing material from a flame retardant acrylic pressure-sensitive adhesive double-sided tape (made by NITTO DENKO CORPORATION, trade name "No. 5011N")
(thickness of 150 μm)
(in which a pressure-sensitive adhesive layer including an acrylic pressure-sensitive adhesive was laminated on both surfaces of a non-woven fabric) (the UL94 VTM-0 standard was met)

Example 14

A pressure-sensitive adhesive layer B below was bonded to one surface of the laminate sheet produced in Example 10 to produce a laminate sheet including a pressure-sensitive adhesive layer.

pressure-sensitive adhesive layer B:
obtained by removing a releasing material from an acrylic pressure-sensitive adhesive double-sided tape (made by NITTO DENKO CORPORATION, trade name "No. 500")
(thickness of 170 μm)
(in which a pressure-sensitive adhesive layer including an acrylic pressure-sensitive adhesive was laminated on both surfaces of a non-woven fabric) (the UL94 VTM-0 standard was not met)

Comparative Example 6

A laminate sheet was produced in the same manner as in Example 6 except that the resin composition layer was formed using only the PES resin.

Comparative Example 7

A laminate sheet was produced in the same manner as in Example 6 except that the resin composition layer was formed using only the PES resin, and the sheet material subjected to the same corona treatment as that in Example 7 was used.

Comparative Example 8

A laminate sheet was produced in the same manner as in Example 6 except that the resin composition layer was formed such that the mass ratio of the PES resin to the PA resin was PES/PA=50/50 in the resin composition layer.

Comparative Example 9

A laminate sheet was produced in the same manner as in Example 6 except that the resin composition layer was formed such that the mass ratio of the PES resin to the PA resin was PES/PA=30/70 in the resin composition layer.

Comparative Example 10

A laminate sheet was produced in the same manner as in Example 6 except that a polyethylene naphthalate (PEN) film (made by Teijin DuPont Films Japan Limited, trade name "Teonex 100 μm") was used instead of the resin composition layer, and the sheet material subjected to the same corona treatment as that in Example 7 was used.

Comparative Example 11

A laminate sheet was produced in the same manner as in Example 6 except that a polyphenylene sulfide (PPS) film (made by Toray Industries, Inc., trade name "TORELINA 100 μm") was used instead of the resin composition layer, and the sheet material subjected to the same corona treatment as that in Example 7 was used.

Comparative Example 12

The pressure-sensitive adhesive layer A was bonded to one surface of the laminate sheet produced in Comparative Example 10 to produce a laminate sheet including a pressure-sensitive adhesive layer.

<Evaluation of Long-Term Heat Resistance>

The produced laminate sheet was cut in the flow direction of the resin composition layer at a width of 15 mm to produce a test sample. The produced test sample was left for 250 hours in a thermostat heated to 240° C. Before and after the test sample was left in the thermostat, a tensile test was performed on the test sample on the test condition of 200 mm/min and a gauge length of 100 mm, and the tensile strength was measured. Then, the strength retention was calculated by the following expression:

strength retention (%)={(tensile strength after the test sample is left)/(tensile strength before the test sample is left)}×100

<Evaluation of Releasing Properties>

The produced laminate sheet was cut in the flow direction of the resin composition layer during the molding at a width of 10 mm to prepare a test sample. The produced laminate sheet was immersed in pure water at 23° C. for 24 hours, and cut at a width of 10 mm in the same manner to prepare a test sample.

In these test samples, the sheet material (wholly aromatic polyamide paper) was pulled at 90° to the resin composition layer and the rate of 200 mm/min, and peeled at 25° C. The state in peeling was observed. Then, the result was evaluated according to the three grades below:
  ○: peeled by breakage of the sheet material
  Δ: peeled by partial breakage of the sheet material
  x: peeled by interlayer peel between the sheet material and the resin composition layer <Evaluation of Flame Retardancy>

A burning test was performed according to the UL94 standard, and the flame retardancy was evaluated.

Specifically, first, each of the laminate sheets produced in Examples and Comparative Examples was cut into a size of 50 mm×200 mm. Thereby, five test pieces were obtained from each of the laminate sheets.

The test piece was rolled into a cylindrical shape, and disposed to extend in the vertical direction. The upper end of the test piece was fixed to hang the test piece. A gauge length was marked at a position 125 mm from the lower end of the test piece. Cotton was placed immediately under the test piece, and a flame was applied to the lower end of the test piece for 3 seconds to perform ignition operation. The ignition operation was performed twice in total.

Then, it was considered passed (○) when the test piece met all the items below. Namely, it was considered passed when the test piece met the VTM-0 standard. Meanwhile, it was considered failed (x) when the test piece did not meet one of the items below.
1. The total flaming combustion time of each of the test pieces (the total of the burning time after application of a first flame and the burning time after application of a second flame) is within 10 seconds.
2. The total of the total flaming combustion times of the five test pieces is within 50 seconds.
3. The flaming combustion time and glowing combustion time of each of the test pieces after application of the second flame is within 30 seconds.
4. No cotton disposed under the test piece is ignited by flaming drips dropped from one of the test pieces.
5. No flaming reaches the gauge length marked 125 mm from the lower end of the test piece.

The results of evaluation of long-term heat resistance (strength retention) and releasing properties in Examples and Comparative Examples are shown in Table 3 and Table 4.

TABLE 3

| | Example 6 | Example 7 | Example 8 | Example 9 | Example 10 | Example 11 | Example 12 | Example 13 | Example 14 |
|---|---|---|---|---|---|---|---|---|---|
| Blended resins | | | | PES/PA | | | | | |
| PES/PA | 95/5 | | 90/10 | | 80/20 | 70/30 | 60/40 | | 80/20 |
| Sheet material | | | | Wholly aromatic polyamide paper | | | | | |

TABLE 3-continued

|  | Example 6 | Example 7 | Example 8 | Example 9 | Example 10 | Example 11 | Example 12 | Example 13 | Example 14 |
|---|---|---|---|---|---|---|---|---|---|
| Corona treatment | No | Yes | No | No | Yes | No | No | Yes | Yes |
| Pressure-sensitive adhesive layer | No | No | No | No | No | No | No | Yes (A) | Yes (B) |
| Strength retention (%) | 75 | 73 | 68 | 62 | 60 | 55 | 50 | 60 | 60 |
| Releasing properties (before immersed in water) | Δ | ○ | ○ | ○ | ○ | ○ | ○ | ○ | ○ |
| Releasing properties (after immersed in water at 23° C.) | Δ | ○ | ○ | ○ | ○ | ○ | ○ | ○ | ○ |
| Flame retardancy | ○ | ○ | ○ | ○ | ○ | ○ | ○ | ○ | X |

TABLE 4

|  | Comparative example 6 | Comparative example 7 | Comparative example 8 | Comparative example 9 | Comparative example 10 | Comparative example 11 | Comparative example 12 |
|---|---|---|---|---|---|---|---|
| Blended resins | PES | PES | PES/PA | PES/PA | PEN | PPS | PEN |
| PES/PA | — | — | 50/50 | 30/70 | — | — | — |
| Sheet material |  |  | Wholly aromatic polyamide paper |  |  |  |  |
| Corona treatment | No | Yes | No | No | Yes | Yes | Yes |
| Pressure-sensitive adhesive layer | No | No | No | No | No | No | Yes (A) |
| Strength retention (%) | 80 | 78 | 21 | 9 | 35 | 46 | 35 |
| Releasing properties (before immersed in water) | X | Δ | ○ | ○ | Δ | X | Δ |
| Releasing properties (after immersed in water at 23° C.) | X | X | ○ | ○ | X | X | X |
| Flame retardancy | ○ | ○ | X | X | X | ○ | X |

INDUSTRIAL APPLICABILITY

The electrically insulating resin composition according to the present invention can be suitably used as a raw material for the sheet material for electrical insulation that needs heat resistance and electrical insulation properties. Specifically, the electrically insulating resin composition according to the present invention is suitable for applications of sheet materials for electrical insulation arranged around the coil wire in the motor, and sheets material for electrical insulation for transformers, bus bars, capacitors, cables, or insulating films for electric circuit boards, for example.

The laminate sheet according to the present invention can be suitably used as the sheet material for electrical insulation that needs heat resistance and electrical insulation properties. Specifically, the laminate sheet according to the present invention is suitable for applications of sheet materials for electrical insulation arranged around the coil wire in the motor, and sheets material for electrical insulation for transformers, bus bars, capacitors, cables, or insulating films for electric circuit boards, for example.

REFERENCE SIGNS LIST

1: laminate sheet, 2: resin composition layer, 3: sheet material, 4: pressure-sensitive adhesive layer

The invention claimed is:
1. A laminate sheet consisting of one resin composition layer and two sheet layers, wherein each of the sheet layers is disposed on opposing surfaces of the resin composition layer and the two sheet layers are bonded to each other with the resin composition layer interposed therebetween, wherein the resin composition layer comprising a polysulfone resin including a plurality of sulfonyl groups in a molecule and a polyamide resin, and the proportion of the polyamide resin is 10 to 40% by mass, the polysulfone resin is a polyether polyphenylsulfone resin that includes a plurality of ether bonds and a plurality of aromatic hydrocarbons in the molecule, the polyamide resin is a semi-aromatic polyamide resin obtained by polymerizing aliphatic diamine with aromatic dicarboxylic acid, each of the sheet layers comprises wholly aromatic polyamide, the laminate sheet meets a UL94 VTM-0 standard, and the laminate sheet exhibits a peel strength of 1.1 N/10 mm or higher and 2.2 N/10 mm or less.

2. The laminate sheet according to claim 1, wherein at least one of the sheet layers is paper produced by a wet papermaking method.

3. The laminate sheet according to claim 1, wherein at least one of the sheet layers is a non-woven fabric.

4. The laminate sheet according to claim 1, wherein at least a surface of one of the sheet layers on a side of the resin composition layer is subjected to a corona treatment.

5. The laminate sheet according to claim 1, wherein the laminate sheet is configured such that an interlayer adhesive force between the resin composition layer and one of the sheet layers is larger than a cohesive failure force of the resin composition layer and that of the one of the sheet layers.

6. The laminate sheet according to claim 1, wherein a strength retention of tensile strength after 250 hours have passed at 240° C. is not less than 50%.

7. The laminate sheet according to claim 1, wherein the sheet laminate is used in application of electrical insulation.

8. The laminate sheet according to claim 1, wherein the semi-aromatic polyamide resin is a semi-aromatic polyamide resin obtained by polymerizing nonanediamine as the aliphatic diamine with terephthalic acid as the aromatic dicarboxylic acid.

9. The laminate sheet according to claim 1, further comprising a pressure-sensitive adhesive layer, wherein the pressure-sensitive adhesive layer is disposed on at least one of topmost surfaces of the laminate sheet, and the pressure-sensitive adhesive layer has flame retardancy that meets a UL94 VTM-0 standard.

10. The laminate sheet according to claim 1, wherein the resin composition layer is molded.

* * * * *